Nov. 3, 1970    J. E. SMITH    3,537,245
FRUIT HARVESTING APPARATUS
Filed Nov. 14, 1968    2 Sheets-Sheet 1

INVENTOR
JOEL E. SMITH
BY
McNENNY, FARRINGTON, PEARNE & GORDON
ATTORNEYS

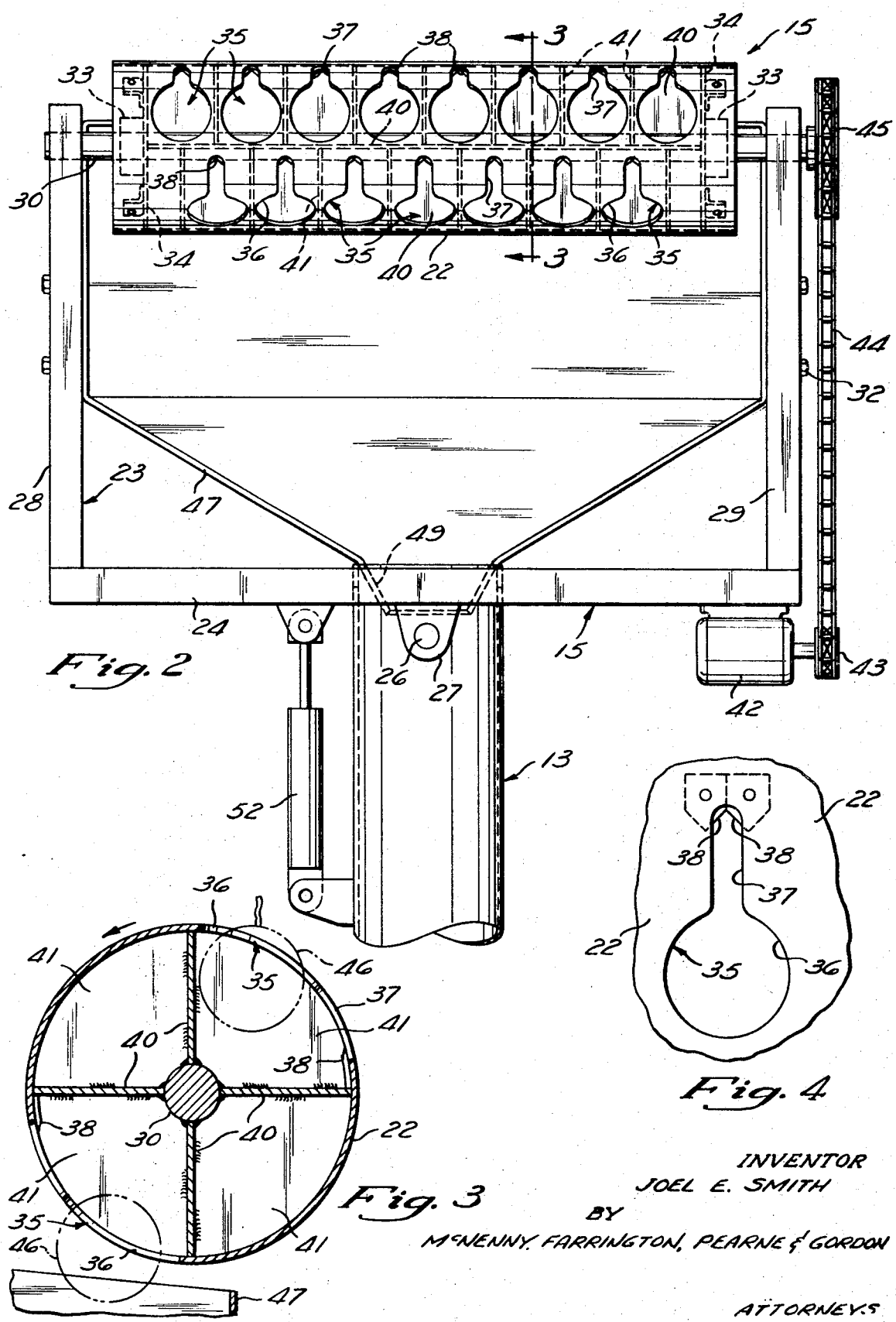

United States Patent Office 3,537,245
Patented Nov. 3, 1970

3,537,245
FRUIT HARVESTING APPARATUS
Joel E. Smith, Rte. 1, Box 75, Longwood, Fla. 32750
Filed Nov. 14, 1968, Ser. No. 775,630
Int. Cl. A01g *19/08*
U.S. Cl. 56—328                                10 Claims

ABSTRACT OF THE DISCLOSURE

A fruit harvester having a picking head which comprises a rotatable drum mounted for axial rotation on one end of a hollow boom. The drum is provided with a plurality of openings for the entry of fruit therein, and each opening has a slot extending therefrom in a direction opposite to the direction of drum rotation so that, after fruit enters an opening, its stem is picked or cut from the tree. After the fruit is picked from the tree, it drops into a compartment within the drum and, after further rotation of the drum, the fruit drops out of its compartment through its entry opening and into a storage apron or receptacle for gravity feed through the hollow boom to a collection station.

This invention relates to fruit harvesting apparatus, and particularly to apparatus for harvesting globular fruit, such as citrus fruit and apples. Such fruit may be harvested by hand-picking or by mechanical devices such as pickers, tree shakers, or blowers. Mechanical harvesting equipment has been proposed for harvesting globular fruit due to rising labor costs and rapidly increasing fruit production.

Mechanical picking devices include a boom which is adapted to be elevated to a picking location and includes a picking head at the end of the boom. Prior art picking heads generally comprise rotating, parallel fingers which comb the tree to remove fruit therefrom, or the picking head may include a plurality of picking cups which are adapted to engage the fruit to be picked and to entrap the fruit within the cups. A comb-type fruit harvester is set forth in U.S. Pat. No. 3,077,720 to Grove et al., and a picking cup-type harvester is set forth in U.S. Pat. No. 3,247,658 to Peacock.

SUMMARY OF THE INVENTION

The present invention provides a simple, inexpensive, mechanical fruit harvester which is adapted to harvest fruit at a high rate yet which will cause little damage to the fruit or the tree.

According to this invention, a picking head comprises a rotatable drum having fruit receiving apertures therein which, when the drum is placed adjacent fruit to be harvested, will receive the fruit and separate the fruit from the tree upon drum rotation. Further rotation of the drum will drop the fruit from the fruit receiving apertures onto a fruit conveyor. The drum according to this invention is adapted to engage a relatively large fruit picking area, yet, as compared to prior art picking heads, is small and is of relatively simple construction.

The drum is mounted for rotation at the end of a hollow boom, which serves as a conveyor for the harvested fruit and which is pivoted to a pedestal so that the proper harvesting elevation may be selected. The pedestal is driven about its vertical axis so that the boom may be swung to a plurality of harvesting positions. The picking head may be canted relative to the boom to harvest fruit in relatively in accessible locations. The rotational speed of the drum may be selected by the operator to suit particular harvesting conditions. Thus, the horizontal and vertical position of the head and the rotational speed of the head may be selected by the operator during a harvesting operation.

OBJECTS OF THE INVENTION

In view of the foregoing, it should be appreciated that it is an important object of the present invention to provide a fruit harvesting machine which is simple to operate and is simple in construction. It will harvest fruit in a highly efficient manner.

It is a further object of this invention to provide a mechanical fruit harvester that may be operated by a single operator and which will harvest fruit from a number of trees without moving the boom supporting vehicle.

It is a still further object of this invention to provide a fruit harvest head which will harvest fruit without any substantial damage to the fruit or to the tree.

These and other objects of the invention will become more readily understood and more apparent from the following drawings and from the detailed description of those drawings.

BRIEF DESCRIPTION OF THE DRAWINGS

FIG. 2 is an enlarged plan view of the picking head portion of the harvester;

FIG. 3 is an enlarged cross sectional view, the plane of the section being indicated by the line 3—3 in FIG. 2; and FIG. 4 is a further enlarged elevational view of a portion of the picking head drum showing one of the apertures therein.

DETAILED DESCRIPTION OF THE PREFFERED EMBODIMENT

Figure 1:
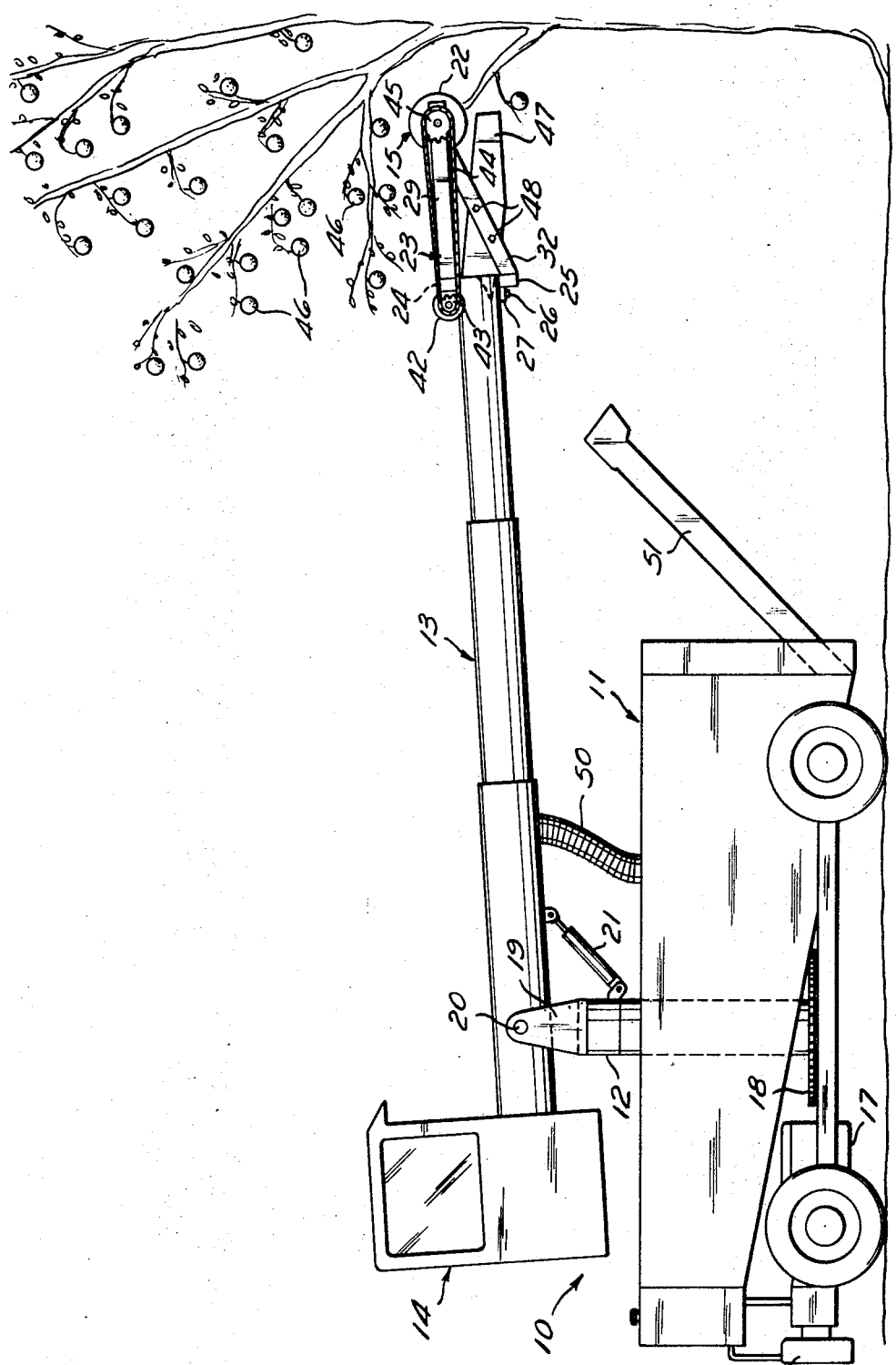
FIG. 1 is an elevational view of a fruit harvester according to this invention.

Referring now to the drawings, a fruit harvesting machine 10 is illustrated. The machine 10 includes a wheeled fruit receiving vehivle 11 having a pedestal 12 mounted thereon for turning about its verical axis. The machine further includes a hollow boom 13 which is pivoted to the pedestal 12 and which has a control cab 14 at one end and a picking head 15 at its other end.

The vehicle 11 is powered by individual hydraulic motors (not shown) mounted on each wheel and the wheels may be provided with a power steering arrangement (not shown).

A hydraulic pump 16 is powered by a diesel engine 17 and the pump 16 supplies fluid to the wheel motors, the power steering assembly, and to hydraulic cylinders and motors which will hereinafter be described in greater detail.

The pedestal 12 is pivotally mounted on the vehicle frame by bearings (not shown) for movement about its vertical axis, and has a ring gear 18 fixed thereto. The ring gear 18 and, therefore, the pedestal 12 may be turned by a driving chain (not shown) which, in turn, is driven by a hydraulic motor (not shown). The top of the pedestal is provided with trunnions 19 which carry the boom 13 for pivotal movement of the boom about a pivot pin 20. The boom 13 may be raised and lowered by a double-acting cylinder 21 which has its piston rod pivoted to the boom 13 and its cylinder pivoted to the pedestal 12.

The picking head 15 comprises a rotatable drum 22 which is mounted horizontally for rotation about its cylindrical axis in a picking head yoke assembly 23. The assembly 23 includes upper and lower parallel beams 24 and 25, respectively, which are pivotally connected to the upper and lower end edges of the boom 13 by pivot pins 26 and bearing blocks 27. The upper beam 24 is provided with side frame members 28 and 29 which rotatably support a drum shaft 30 therebetween. The side frame members 28 and 29 are supported by braces 32, which extend to the side frame members 28 and 29 from the beam 25.

The drum 22 is fixed to the shaft 30 for rotation therewith by collars 33, which are keyed to the shaft 30. The collars 33 are in turn welded to drum end plates 34.

The drum 22 is provided with a plurality of apertures or openings 35, and each opening 35 has a generally circular portion 36 which constitutes a fruit entry and exit portion and an elongated slot 37 which comprises a fruit stripper section. Preferably, the end of the slot 37 is provided with a cutting blade assembly for severing fruit stems, although the provision of the slot 37 itself will effectively sever the fruit from its stem. The cutting blade assembly comprises a pair of blades 38 which are fixed to the inside surface of the drum 22 at the end of each slot 37. In the illustrated embodiment, the openings 35 are arranged in four longitudinally extending rows, with the openings of one row being offset from the openings of immediately adjacent rows. Thus, as is shown, two diametrically opposed rows have eight openings and two diametrically opposed rows have seven openings. The diameter of the circular portion 36 of each opening depends upon the type fruit to be harvested. In the illustrated embodiment, the circular portion 36 has a diameter of 4⅜ inches, and is adapted to receive oranges.

Each opening 35 opens into its own compartment within the drum 22. The compartments are formed by radially and longitudinally extending plates 40 which are fixed at their ends to the end plates 34, and which are fixed at their sides to the shaft 30 and to the inner surface of the drum 22. Each compartment is also formed by radially and circumferentially extending plates 41, which are spaced apart by a distance which is slightly greater than the circular portion 36 of each opening 35.

The drum 22 is rotated about its cylindrical axis by a hydraulic motor 42. The motor 42 is provided with a drive sprocket 43 which, by means of a chain 44, drives a sprocket 45 which is keyed to one end of the shaft 30. The motor 42 drives the drum 22 in a counterclockwise direction, as viewed in FIGS. 1 and 3, so that its surface engages fruit to be harvested. As may be seen most clearly in FIG. 3, globular fruit 46 enters an opening 35 through the circular portion 36 and, upon continued counterclockwise rotation of the drum 22, its stem is guided into the slot 37 and is severed by the blades 38. After the stem is severed, the fruit 46 is received within a compartment defined by the plates 40 and 41. Upon further rotation of the drum 22, the fruit 46 drops out of the compartment and is received by an open-topped receptacle 47 which is positioned below the drum 22. The receptacle 47 is fixed to the braces 32 by bolts 48 and has a funnel mouth 49 which opens into the end of the hollow boom 13. Thus, if the boom 13 is more nearly horizontal than vertical during a harvesting operation, fruit will be received by the receptacle 47 and stored therein until the boom 13 is raised to a position which is sufficient to cause the fruit to roll through the hollow boom. Obviously, when the boom is elevated during the harvesting operation, the fruit will be received by the receptacle and then roll into the hollow boom through the mouth 49.

Harvested fruit which rolls through the hollow boom 13 is received in a storage compartment within the vehicle 11 by dropping through a flexible tube 50. The fruit may then be packed in field boxes, or may be conveyed by a conveyor 51 to a grove vehicle.

The picking head 15 may be horizontally canted to pick fruit at relatively inaccessible locations. There is provided a cylinder 52 which is pivoted at one end to the boom 13 and at the other end to the upper beam 24 so that extension or retraction of the piston rod will cause the beams 24 and 25, and therefore the receptacle 47 and the drum 22, to pivot about the pins 26.

The boom 13 may be raised and lowered to the desired harvesting elevation by the cylinder 21 and the pedestal 12 may be rotated to swing the boom 13 to harvesting locations. The pedestal 12 and the boom 13, moreover, may be made in telescopic sections and hydraulic extending means (not shown) may be employed to axially extend the pedestal 12 and the boom 13. All of these operations may be controlled by the operator in the control cab 14 and, further, the speed of rotation and the degree of cant of the drum 22 may also be controlled by the operator. The speed of rotation of the drum is dependent upon the particular fruit being harvested, and should be selected so that the fruit is permitted to drop out of the openings 35, rather than butting against the slot 37 due to the centrifugal forces imparted thereto.

Although the preferred embodiment of the invention has been shown and described in detail, it is recognized that various modifications and rearrangements will readily occur to those skilled in the art upon a full comprehension of the invention, and may be resorted to without departing from the scope of the invention.

I claim:

1. A fruit harvester comprising a hollow cylindrical drum mounted for axial rotation at one end of a boom, a plurality of openings in said drum through its cylindrical wall, means to rotate said drum about its cylindrical axis, means to position said boom so that said cylindrical drum engages fruit to be harvested and so that the fruit is received through said openings, each opening in said drum having means to pick the fruit from the tree upon further rotation of the drum after entry of fruit therein, conveyor means beneath said drum for receiving fruit from openings passing over said conveyor means.

2. A fruit harvester according to claim 1 wherein said means to pick fruit from the tree comprises an elongated slot constituting a portion of each opening and extending in a direction away from the intended rotational direction of the drum, whereby the stem enters said slot upon said further rotation.

3. A fruit harvester according to claim 2 wherein a cutting blade is provided at the end of said slot to cut said stem.

4. A fruit harvester according to claim 1 wherein said conveyor means includes an open-topped receptacle at one end of the boom which is located below the drum when the boom is extended in nonvertical positions.

5. A fruit harvester according to claim 4 wherein said conveyor means includes a chute which communicates with said open-topped receptacle.

6. A fruit harvester according to claim 5 wherein the boom is hollow and comprises said chute.

7. A fruit harvester according to claim 1 wherein said drum has a plurality of compartments and wherein each opening opens into its own one of said compartments.

8. A fruit harvester according to claim 1 wherein said openings are provided in rows which extend along the longitudinal length of the drum and wherein the openings in each row are staggered with respect to the openings in circumferentially adjacent rows.

9. A fruit harvester according to claim 1 wherein means are provided to pivot the drum at said one end of the boom to thereby change the position of said cylindrical axis relative to the boom.

10. A fruit harvester having a picking head which comprises a rotatable drum mounted for axial rotation at one end of a boom, a plurality of circumferentially spaced openings in said drum, means to rotate said drum about its cylindrical axis so that each opening is successively presented to a fruit picking station above said axis and then to a fruit discharge station below said axis, said drum having a plurality of compartments, and each opening providing access to its own one of said compartments.

References Cited

UNITED STATES PATENTS

| | | | |
|---|---|---|---|
| 3,127,725 | 4/1964 | Richardson | 56—328 |
| 3,247,658 | 4/1966 | Peacock | 56—328 |
| 3,401,514 | 9/1968 | Clark | 56—328 |
| 3,413,786 | 12/1968 | Wehr | 56—328 |
| 3,460,328 | 8/1969 | Lee | 56—328 |

RUSSELL R. KINSEY, Primary Examiner